SUSPENSION SYSTEM FOR COLOR TELEVISION TUBE MASK

Filed June 22, 1966

INVENTORS:
JAMES W. SCHWARTZ
LASZLO JAVORIK
BY Dawson, Tilton, Fallon, Lungmus & Alexander
ATT'YS

SUSPENSION SYSTEM FOR COLOR TELEVISION TUBE MASK

Filed June 22, 1966 Sheet 2 of 3

*INVENTORS:*
JAMES W. SCHWARTZ
LASLO JAVORIK
BY Dawson, Tilton, Fallon, Lungmus & Alexander
ATT'YS FIG. 11
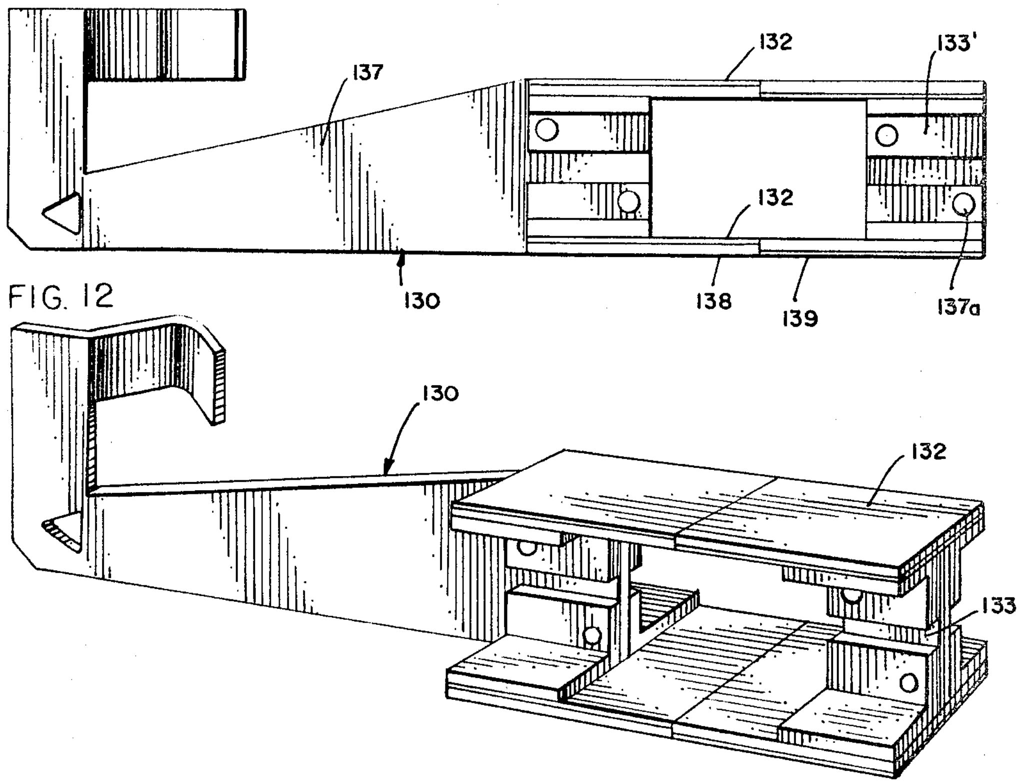
FIG. 12
FIG. 13
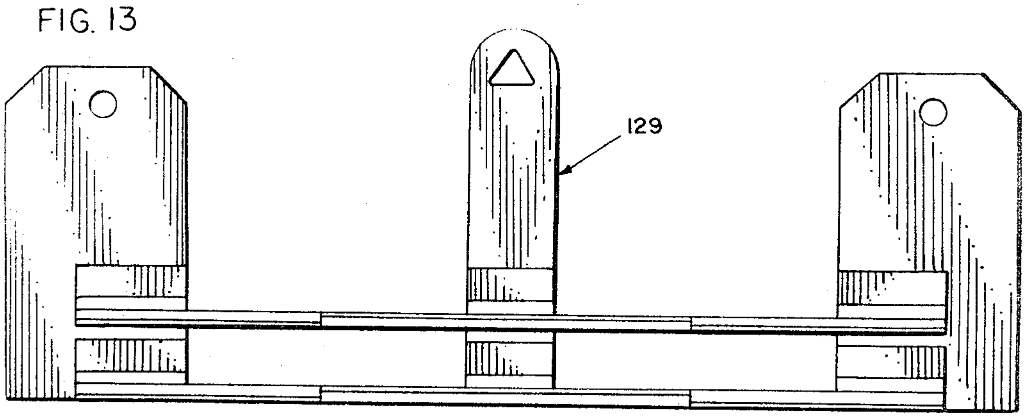
*INVENTORS:*
JAMES W. SCHWARTZ
LASZLO JAVORIK
BY Dawson, Tilton, Fallon, Lungmus & Alexander
ATT'YS 3,449,611

SUSPENSION SYSTEM FOR COLOR TELEVISION TUBE MASK

James W. Schwartz, Western Springs, and Laszlo Javorik, Chicago, Ill., assignors to National Video Corporation, Chicago, Ill., a corporation of Illinois Filed June 22, 1966, Ser. No. 559,623

Int. Cl. H01j *29/46, 29/18*

U.S. Cl. 313—85 9 Claims

This invention relates to a suspension system for a color television tube mask and, more particularly, to a system adapted to substantially compensate for the thermal shift of the mask openings during operation.

This application is related to the co-owned application of James W. Schwartz et al., Ser. No. 554,106, filed May 31, 1966, now Patent No. 3,370,194.

In the above-mentioned patent application, it was explained that the impingement of the electron beam on the mask warms the mask and causes it to expand. The above-mentioned application was concerned with apparatus and method for preventing the center of the mask from shifting. This kept the openings in the mask center, i.e., about the axis in alignment with their associated phosphor dots.

The instant invention goes further and provides for total compensation of the mask due to thermal effects and the provision of a suspension system of this character constitutes an important object of the invention.

It will be appreciated that the mask expands radially outwardly—the perimetric frame becoming enlarged—so that there is no longer alignment between the electron gun and the majority of the phosphor dots, even with the compensation of the earlier mentioned application. In particular, a given opening in the screen is displaced away from the tube axis from its position of alignment. This misalignment can be corrected by moving the mask axially of the tube and the provision of means for connecting the tube and mask that automatically achieves this axial movement constitutes another object of the invention. For example, the abovementioned means moves the mask toward the face plate of the tube upon heat-up so that the previously displaced given opening once again is in register with the electron beam directed at the associated phosphor dot.

It will further be appreciated that the glass envelope of the tube is subject to expansion upon temperature increase. Generally this is less than that of the mask—in one commercial embodiment being about one-third. Therefore a mask compensation which disregards this will be an over compensation. The inventive arrangement makes possible the differential compensation required and the provision of means that makes this readily feasible constitutes another object of the invention.

Other objects and advantages of the invention may be seen in the details of construction and operation set down in this specification.

The invention is described in conjunction with the accompanying drawing, in which:

FIG. 1 is an elevational view of the face plate portion of a rectangular color television tube, with the above-mentioned mask mounted in place;

FIG. 2 is a sectional view, taken transversely through the face plate of a television tube, and showing means for mounting the top of the mask; while FIG. 3 is a view similar to FIG. 2 but showing the mounting means in a different operative condition;

FIG. 4 is a sectional view taken along the line 4—4 of FIG. 1 to show the side mounting means while FIG 5 is a view similar to FIG. 4 but showing the means for mounting the side in a different operative condition;

FIG. 7 is an elevational view of alternative top-mounting means while

FIG. 9 is an elevational view, on large scale, of the side-mounting means seen in FIG. 4 with the dotted line portion reflecting the alternative condition seen in FIG. 5 while

FIG. 11 is an elevational view of a modified form of side mounting means while FIG. 12 is a perspective view of the showing in FIG. 11; and FIG. 13 is an elevational view of a modified form of means for mounting the top of the mask.

Figures 1, 2, 3, 4, 5:
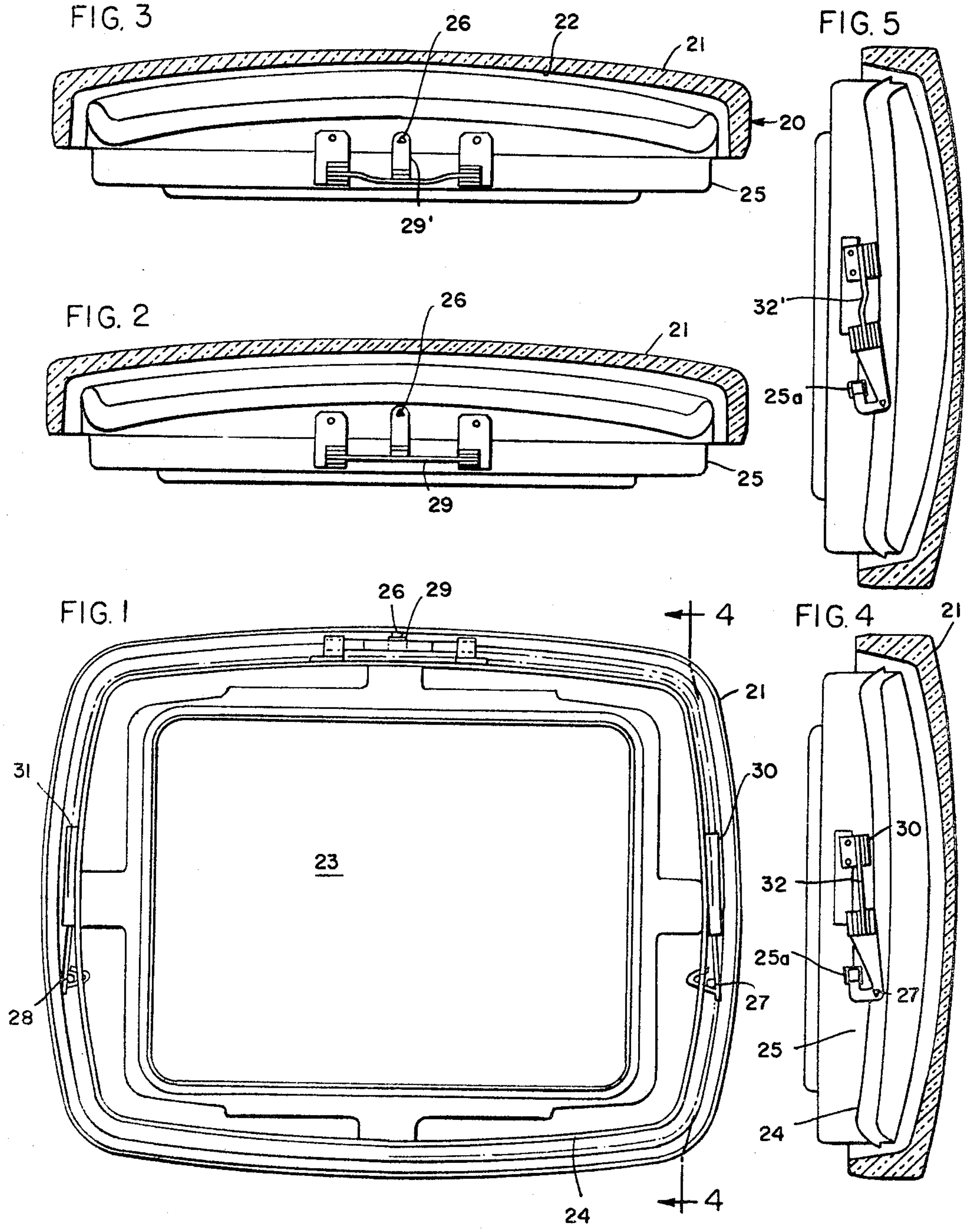

In the illustration given, the numeral 20 designates generally a rectangular color television tube which, for the purposes of clarity, shown only in the extreme forward end thereof, i.e., the face plate 21. Provided on the interior front face of the face plate 21 is the usual phosphor screen 22 (designated only in FIG. 3) which is made up of a plurality of phosphor dots scintillating in red, blue and green colors respectively, so arranged that each one of the dots, representing red, blue and green fields can be energized by the first, second and third guns respectively, which—due to this reason—hereafter will be called red, blue and green guns. The beams emanate from an electron gun (not shown) in conventional fashion.

The numeral 23 designates generally the previously-referred to mask, and the mask 23 includes a frame 24 providing a perimetric lip 25. The screen itself is perforated at positions correlated to the location of the phosphor dots in the screen 22.

The interior of the face plate 21 is equipped with a top-pivot 26 aligned with the vertical center lines of the screen 22 and the mask 23. Side pivots as at 27 and 28 are also provided. These post-like elements are partially embedded within the face plate 21 and project inwardly therefrom. For mounting the mask on the pivots 26–28, three clips of spring-like material are provided as at 29 relative to the top pivot 26, and 30 and 31 relative to the side pivots 27 and 28, respectively. It is the clips 29–31 with which the instant invention is concerned.

Figure 9:
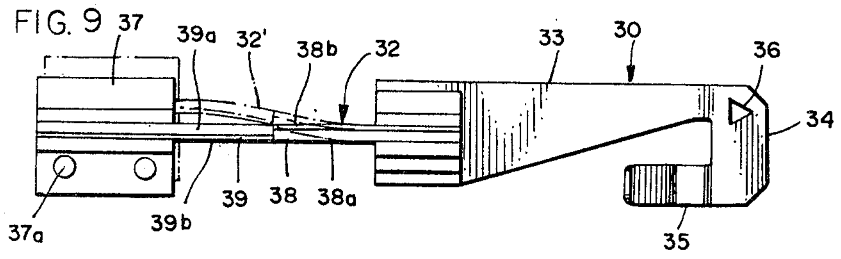
Figure 10:
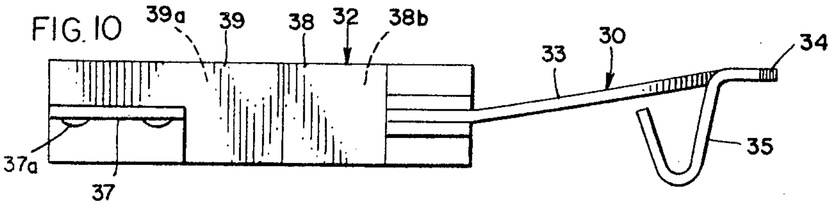
FIG. 10 is a side elevational view of the side-mounting means seen in FIG. 9.

Referring now to FIGS. 9 and 10, a side clip 30 of the cantilever type is seen which is structurally much like that described in the above-mentioned application, having essentially a J-shape. Essentially, the difference resides in the interposition of the section generally designated 32 which provides for the total compensation desired. Before going into the details of construction of the section 32, it will be noted that as in the prior application, the clip 30 has a spring part 33 which includes an integral tab portion 34. The tab portion 34 further includes as an integral part a hairpin configuration 35 (developed by partially folding tab portion 34 on itself) so as to engage a slot (not shown) in the flange 25. The spring part 33 also includes an aperture 36 which permits engagement of the element 30 with the post 27 associated therewith.

Comparison of FIGS. 4 and 5 shows how the section 32 flexes under the influence of temperature increase to compensate for mask expansion. The section 32 becomes an S-shape 32' (see FIG. 5) to position the mask closer to the screen 22 and thus maintain the openings of the mask in register with the electron beam. Of considerable importance in this regard is the fact that the shift of the mask occurs without rotation of the clip 30 about the post 27. Rotation of the clip 30, if it did occur or was contemplated, is undesrable. The fact that there is a definite radius to the section 32 from the pivot center about post 27 and the existence of friction between the post 27 and clip 30 would create considerable resistance in the form of a moment. This restricts the action of the bimetal and would make it non-repetitive.

Comparison of FIGS. 2 and 3 reveals how the top clip 29 is affected by temperature to cooperate with the side clips in shifting the mask 23. It will be appreciated that the top clip 29 is not cantilevered, so that there would be no tendency of it to rotate about its post 26.

Relative to the side clips 30 and 31, these are equipped with the configurations 35 which are received within apertures **25*a* in the flange (see FIG. 4). Sufficient clearance is provided between elements 35 and 25*a* to allow axial movement of the mask 23. This clearance is great enough to achieve the thermal compensation (approximately 0.002") but small enough to enable the portion 35** to absorb kinetic shocks.

As before, the end of the clip 30 opposite that adapted to be secured to the post 27 (by virtue of the aperture 36) is equipped with a base part 37 for securement to the mask, as by welding at dimples **37*a*. Interposed between the base part 37 and the spring part 33, is the already-mentioned new section 32 which is seen to be constructed of two sections of bimetal arranged in end-to-end connected relation, the two segments being designated 38 and 39. The laminate of the bimetal 38 having the high coefficient of thermal expansion is designated 38*a* while that having the low coefficient of thermal expansion is designated 38*b*. In like fashion, the high and low laminates of 39 are designated 39*a* and 39*b* and reference to FIG. 9 reveals that the high and low laminates in the bimetal segments 38 and 39 are reversed. Upon subjecting the mask to temperature increase, the section 32 develops a reverse of S-curve of the nature shown in dotted line and designated 32'** in FIG. 9 (also FIG. 5).

Figure 6:
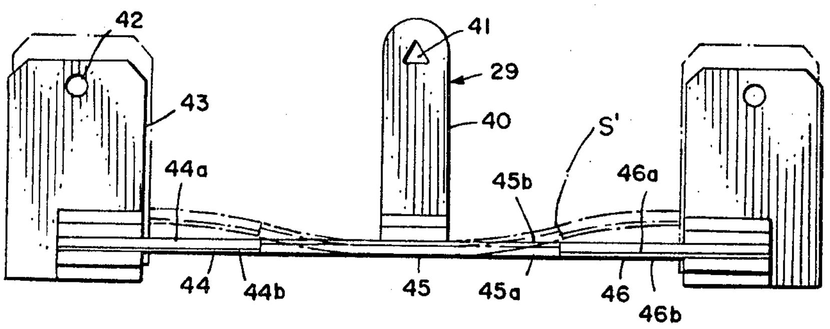
FIG. 6 is an elevational view, on larger scale, of the top-mounting means seen in FIG. 2 and showing the alternate condition of FIG. 3 in dotted line.

For securing the top of the mask to the face plate, the clip 29 is employed which can be seen in FIG. 6. This is essentially T-shaped and includes a tab portion 40 equipped with an aperture as at 41 for mounting the clip 29 on the associated pivot post provided at the top of the face plate. As before, the end portions of the spring clip are equipped with dimples as at 42 relative to the base portion 43 for the purpose of securing the spring clip to the mask. Intermediate the end portions is provided another arrangement of bimetals at at 44, 45 and 46. The arrangement of the laminated layers of metal in the bimetal section 44 and 46 is the same, while that in the section 45 is reversed therefrom. In other words, the metal of high-thermal conductivity in the section 45 is designated **45*a* and is seen to be longitudinallly-aligned with the layers of low-thermal conductivity 46*b* and 44*b* in FIG. 6. Under thermal stress, the segments 44, 45 and 46 assume the configuration shown in dotted line in FIG. 6, and designated generally S'**, thereby compensating for temperature increase in the mask.

Alternate arrangements of the preferred forms of console clips can be seen in FIGS. 11–13. In FIGS. 11 and 12, the side clips are designated generally 130 and differ from the clip 30 of FIGS. 9 and 10 in having a pair of bimetal sections 132 interconnecting parts 137 and 133. The part 133 is weldably connected to the frame as at dimples **137*a*. Each section 132 is made of segments 138 and 139** with the component layers arranged as in FIG. 8, the dual arrangement providing greater rigidity.

By the same token, the double bimetal section can be used in the top clip, this being designated 129 in FIG. 13. The segments 44–46 find dual counterparts in segments 144–146, arranged in layers in the same relation as seen in FIG. 6. While in this drawing we show a double bimetal structure only, the S-shape deflection of the bimetal enables us to use as many parallel coupled bimetals as needed for rigidity.

Figure 7:
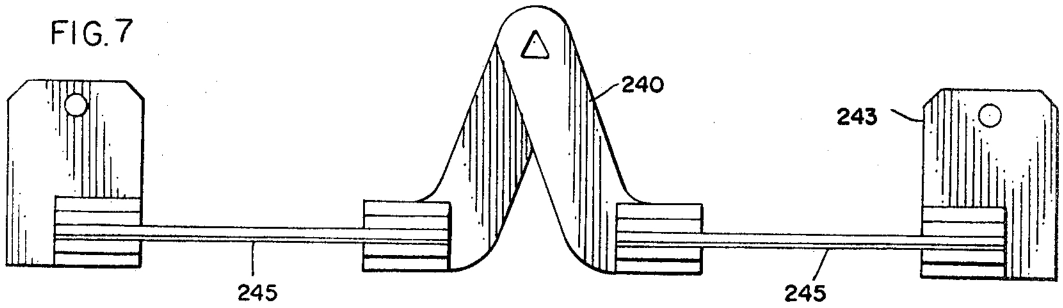
Figure 8:
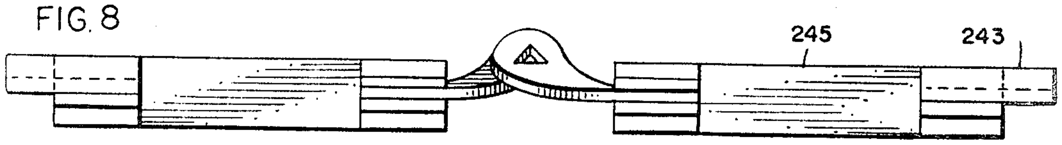
FIG. 8 is a side elevational view of this alternative form.

In some instances, the arrangement shown in FIGS. 7 and 8 may be employed wherein the two arms of the top spring clip are not rigidly interconnected but follow more closely the teachings of the above-mentioned application. In such case, only a single segment of a bimetal is employed as at 245 interconnecting the apertured tab part 240 with the welded base part 243. When subjected to temperature increase, the bimetal section does not have the duplex action characteristic of the modification of FIG. 6 but does expand to a degree to afford approximate temperature compensation. In this version, there is a slight rotation of the clip about its associated post.

The degree of flexure of the bimetal means as at 32 or S may be advantageously controlled by the dimensions and character of the laminates making up the bimetal means. In this way the concurrent expansion of the tube 20 can be taken into account, as for example the tube may increase 7° F. when the mask 23 increases 20° F. in temperature. In a 23" rectangular color tube denominated 23EGP22 according to the JADEC specification, the clip 30 may have a section 32 of a thickness of the order of 0.050" and a length between spring part 33 and the base part 37 of the order of about one inch. The section 32 is divided about equally between the reversely-oriented segments 38 and 39, each being constructed of a cobalt alloy for the high temperature coefficient metal and Invar (36% nickel, the remainder essentially iron) as the low temperature coefficient material.

While in the foregoing specification a detailed description of the nivention has been set down for the purpose of explanation, many variations in the details herein given may be made by those skilled in the art without departing from the spirit and scope of the invention.

We claim:

1. In a relatively elongated color television tube having an enlarged end with mask mounting posts extending inwardly at the top and sides of said tube adjacent said enlarged end, a mask positioned in said tube adjacent said enlarged end, and spring clips connecting said posts and corresponding portions of said mask, each spring clip comprising two parts, one part being connected to its associated post and the other part being connected to the corresponding portion of said mask, and bimetal means coupling said parts for moving said mask toward said enlarged end to compensate for expansion of said mask due to temperature increase thereof.

2. The structure of claim 1 in which said bimetal means has a generally planar segment extending generally transversely of the length of said tube.

3. The structure of claim 2 in which said bimetal means includes two generally planar segments extending generally transversely of the tube length.

4. The structure of claim 3 in which said segments are arranged in end-connected, reverse relation whereby said bimetal means is adapted to assume a generally S configuration upon temperature increase.

5. The structure of claim 4 in which a third segment is provided, the three segments being serially end-connected with the intermediate segment defined thereby being reversely oriented relative to the other segments, said intermediate segment being conected to the top post of said tube.

6. The structure of claim 4 in which said bimetal means includes a second set of end-connected, reversely related segments disposed parallel to the first-mentioned segments whereby the rigidity of said spring clip is substantially increased.

7. The structure of claim 6 in which the said clip is of the cantilever type, the plurality of sections being effective to translate said mask without rotation of said clip about its associated post.

8. In a relatively elongated color television tube having an enlarged end with mask mounting posts extending inwardly at the top and sides of said tube adjacent said enlarged end, a mask positioned in said tube adjacent said enlarged end, and spring clips connecting said posts and corresponding portions of said mask, each spring clip being constructed and arranged for moving said mask toward said enlarged end to compensate for expansion of said mask due to temperature increase and without rotation of said spring clip about its associated post.

9. The structure of claim 8 in which each clip includes two parts, one part being connected to its associated post and the other part being connected to the corresponding portion of said mask, and bimetal means coupling said parts.

References Cited

UNITED STATES PATENTS

| | | | |
|---|---|---|---|
| 3,296,477 | 1/1967 | Shrader et al. | 313—85 |
| 3,296,625 | 1/1967 | Shrader | 313—85 |
| 3,334,259 | 8/1967 | Shrader | 313—85 |
| 3,346,753 | 10/1967 | Haas | 313—85 |
| 3,358,170 | 12/1967 | Fiore | 313—85 X |
| 3,370,194 | 2/1968 | Schwartz et al. | 313—92 |

JOHN W. HUCKERT, *Primary Examiner.*

R. F. POLISSACK, *Assistant Examiner.*

U.S. Cl. X.R.

313—92, 238, 292